Jan. 9, 1940.　　　　　G. H. ORR　　　　　2,186,305
FLEXIBLE COUPLING
Filed May 16, 1938　　　2 Sheets-Sheet 1
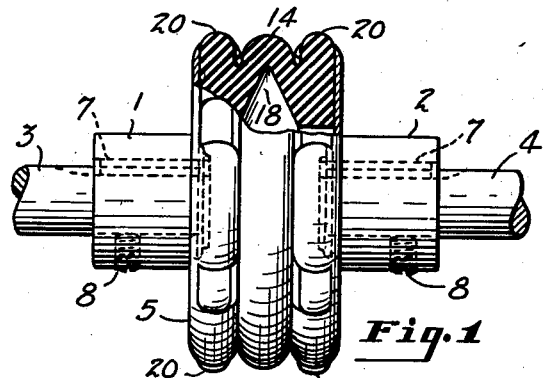
Fig.1
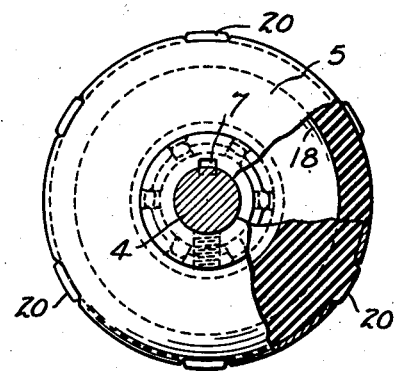
Fig.2
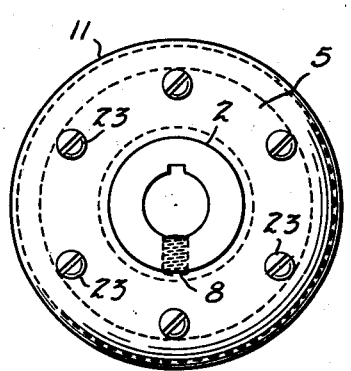
Fig.5
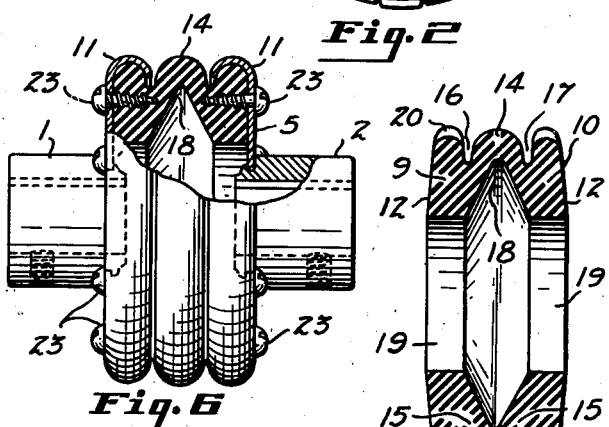
Fig.6
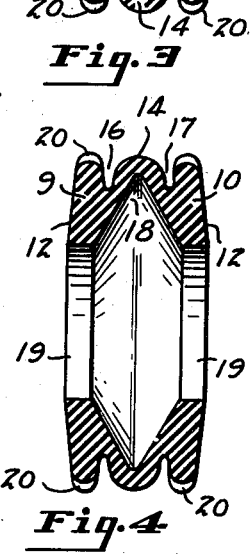
Fig.3
Fig.4
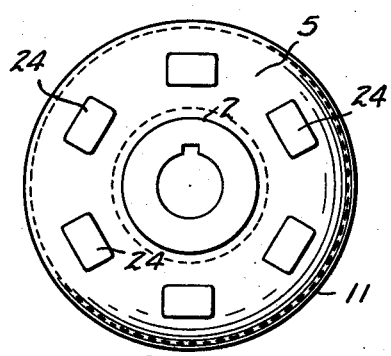
Fig.7
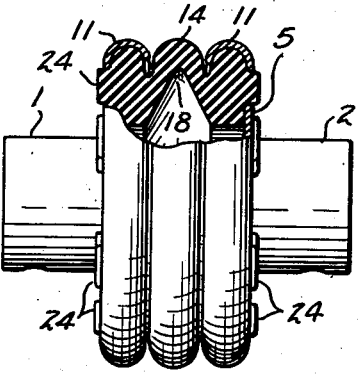
Fig.8
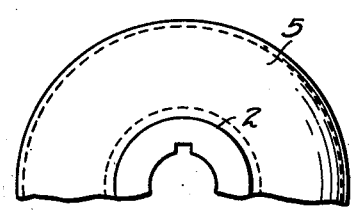
Fig.9　　Fig.10
INVENTOR
Glenn H. Orr
BY Evans + McCoy
ATTORNEYS Jan. 9, 1940.   G. H. ORR   2,186,305
FLEXIBLE COUPLING
Filed May 16, 1938   2 Sheets-Sheet 2

INVENTOR
Glenn H. Orr
BY
Evans + McCoy
ATTORNEYS

Patented Jan. 9, 1940

2,186,305

UNITED STATES PATENT OFFICE 2,186,305

FLEXIBLE COUPLING

Glenn H. Orr, Akron, Ohio, assignor to The General Tire & Rubber Company, Akron, Ohio, a corporation of Ohio Application May 16, 1938, Serial No. 208,142

14 Claims. (Cl. 64—11)

This invention relates to shaft couplings and more particularly to couplings employing a resilient and deformable body member secured between relatively rigid elements fastened on the shaft to be joined.

An object of the invention is to provide an improved coupling for effecting a resilient driving connection between aligned shafts.

Another object is to provide a coupling for shafts which will permit slight misalignment between the shafts and which will also permit the axis of one shaft to be disposed at a slight oblique angle with respect to the axis of the other shaft.

A more specific object is to provide a coupling employing a resilient and deformable body portion formed of rubber composition which may be replaced when worn or injured and which may be made in different degrees of elasticity and strength, so that the same coupling can be used in installations requiring different operating characteristics merely by changing the resilient and deformable body portions employed.

A still further object is to provide a coupling of the character described which is compact and neat in appearance, which is relatively simple in design and construction and inexpensive to manufacture. Other objects and advantages will become apparent from the following detailed description of the invention made in connection with the accompanying drawings, in which:

Figure 1 is an elevational view partly in section and with parts removed showing a coupling which embodies the invention connecting the ends of two shafts;

Fig. 2 is an end view of the coupling illustrated in Fig. 1 with parts broken away;

Figs. 3 and 4 are sectional views of the resilient, deformable torque-transmitting and shock-absorbing bodies made of rubber composition and used in couplings of the present invention;

Fig. 5 is an end view of a modified form of coupling;

Fig. 6 is an elevational view, with parts removed, of the coupling illustrated in Fig. 5;

Fig. 7 is an end view similar to Figs. 2 and 5, illustrating another modification of the invention;

Fig. 8 is an elevational view with parts removed of the coupling shown in Fig. 7;

Fig. 9 is a fragmentary end view showing another modification of the coupling;

Fig. 10 is a fragmentary elevational view with parts removed showing the coupling illustrated in Fig. 9;

Figure 11:
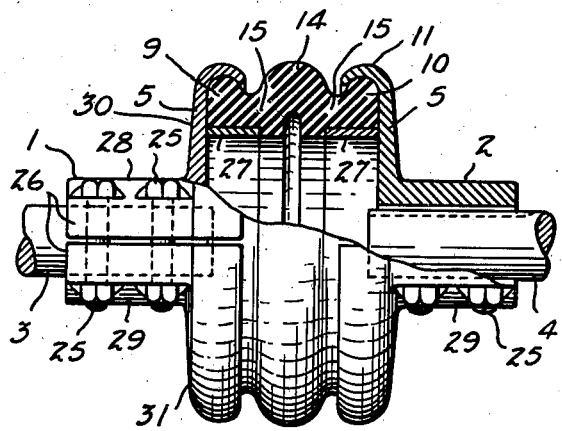
Fig. 11 is an elevational view with parts removed showing still another modification of the invention.

Referring to the drawings by numerals of reference, which indicate like parts throughout the several views, the coupling comprises a pair of hubs 1 and 2 secured on the opposed ends of shafts 3 and 4, respectively, and provided with radially extending flanges 5. Between the flanges on the opposed hubs is disposed a resilient and deformable body member preferably constructed of a suitable rubber composition and arranged to transmit the turning movement of one hub and flange to the other hub and flange. In Figs. 1 and 2 is illustrated a preferred embodiment of the invention in which the hubs 1 and 2 are substantially cylindrical in form and have axial bores which receive the ends of the shafts 3 and 4. The hubs are secured against rotation on the shaft by keys 7 and held in position by set screws 8. The radial disklike flanges 5 are splined on reduced diameter portions at the ends of the hubs 1 and 2 and are secured by peening over the metal of the reduced diameter portions of the hubs. The flanges may be formed of suitable material such as sheet or plate steel and are spaced apart from one another in substantially parallel planes to receive therebetween the resilient torque-transmitting rubber body.

The resilient body is preferably in the form of a substantially circular or annular rubber band. As shown in Figs. 3 and 4, the outside diameter of the band is preferably several times its axial length and its inside diameter is also greater than its axial length.

However, a radial section through the rubber forming the band shows that it has a greater axial length than radial thickness. These general dimensional features have been found to give a coupling having improved operating and performance characteristics, as well as affording a compact and attractive design.

A pair of annular beads 9 and 10 are formed at the opposite ends of the resilient body and are received in clincher type rims 11 formed by rolled marginal edge portions of the flanges 5. End faces 12 of the resilient body are preferably slightly convex or conical in shape so as to be pressed firmly against the inner faces of the flanges 5 for frictional engagement therewith when the peripheral edges of the beads are received in the clincher rims 11.

Extending between and preferably integral with the beads 9 and 10 is a connecting band substantially U or V-shaped in cross-section. This band has a central, substantially annular or circular portion 14 of greater radial thickness than marginal portions 15 thereof which connect the band to the beads 9 and 10.

The thickened portion 14 of the connecting band is of greater diameter than the beads 9 and 10 and the marginal portions 15. A pair of substantially annular grooves 16 and 17 are formed, one on each side of the central portion 14 between the beads 9 and 10.

On the inner or axially directed side of the resilient rubber body is formed a substantially circular groove 18 disposed between the beads 9 and 10 and opening to a central bore 19 extending axially through the rubber body of the coupling. Preferably the groove 18 is substantially wedge-shaped in cross-section and is concentric with the thickened portion 14 of the connecting band.

At spaced portions about the periphery of the coupling the rolled rim 11 is cut away to receive radially directed extensions or bosses 20 formed on the beads 9 and 10. These bosses resist relative rotational movement between the resilient rubber body of the coupling and the flanges 5 to effect a positive driving connection between the shafts 3 and 4.

The free edges of the rolled rim 11 on the flanges 5 extend into the grooves 16 and 17 between the beads 9 and 10 and the central thickened portion 14 of the body. In this manner the flanges retain an effective grip on the resilient body to provide a smooth, vibrationless driving connection between the shafts, even when the latter are in slight misalignment or when there is, periodically, slight relative longitudinal movement of one shaft with respect to the other.

Preferably the resilient body of the coupling, which may be formed by molding, if desired, is vulcanized so that the beads 9 and 10 are slightly larger in diameter than the space provided within the clincher rims 11 of the flanges. Accordingly, when the coupling is assembled the resilient rubber body is slightly compressed to increase the frictional engagement between the beads and flanges. During operation of the coupling at high rotational velocity the relatively thick central portion 14 of the connecting band of the body tends to expand radially, thus increasing the frictional grip of the clincher flanges on the resilient body.

According to the present invention the resistance to deformation of the resilient body may be regulated by increasing or decreasing the size of the internal groove 18. For example, in Fig. 1 is illustrated a resilient rubber body for the coupling in which the groove 18 is of relatively small size so that the U-shaped connecting band of rubber between the flanges 9 and 10 is relatively thick and capable of transmitting relatively high torque loads with a minimum of deformation.

In Fig. 3 is illustrated a rubber body for the coupling in which the groove 18 is medium size for transmitting average torque load, while Fig. 4 illustrates a rubber body for the coupling in which the groove 18 is of considerable size so that the U-shaped band connecting the beads 9 and 10 is relatively thin in radial dimension and is relatively easily deformed and adapted for efficiently transferring relatively light torque loads.

An advantage of this type of construction is in connection with the manufacture of the rubber body, since by merely changing the core used in molding the resilient rubber body for the coupling, couplings having a wide variety of capacities may be produced, all of the couplings employing the same size and shape of hubs and flanges, if desired, and in general having the same external appearances, the change in capacity being effected through the difference in radial dimensions of the rubber bands connecting the beads.

In Figs. 5 and 6 is illustrated a modification of the invention in which the rolled rim or flanges 11 are continuous about the periphery of the beads 9 and 10 instead of having portions cut away, like the couplings illustrated in Figs. 1 and 2. A positive drive between the resilient rubber body and the flanges 5 is effected by a multiplicity of screws 23 which extend in an axial direction through suitable apertures in the flanges 5 and are threadedly received in the beads 9 and 10 of the resilient body.

Figs. 7 and 8 illustrate another modification of the coupling in which a multiplicity of lugs or bosses 24 integral with the beads 9 and 10 extend axially from the end faces 12 thereof through suitable apertures or recesses in the flanges 5. These bosses effect a positive drive between the flanges and the rubber body of the coupling and permit the clincher rims 11 to be unbroken in peripheral contour.

Figs. 9 and 10 illustrate another modification of the invention in which the driving connection between the deformable body and the flanges 5 is effected solely by frictional engagement between the beads and the flanges. This frictional force is sufficient in most applications of couplings of this character to establish and maintain a driving connection because of the outward expanding force exerted on the clincher rims 11 by the beads 9 and 10 resulting from the compression or deformation of the latter in assembling the coupling. This modification provides a novel safety device in the driving connection between shafts. If one shaft should be suddenly subjected to an excessive load or a braking action greater than the capacity of the coupling, then either the beads 9 or 10 or both would slide in the corresponding clincher rim 11, permitting rotation of one shaft relative to another without injury to the coupling. Furthermore, the distortion or twisting of the rubber body incident to the overloading thereof, partially reduces the frictional engagement between the beads and flanges to reduce the wear of the coupling parts during such slippage.

Figure 12:
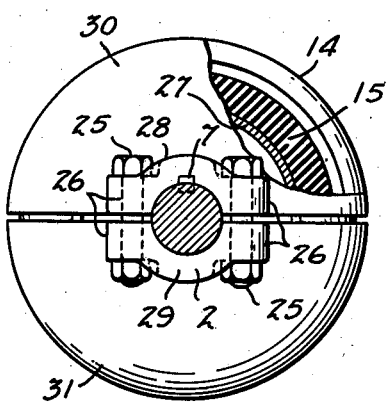
Fig. 12 is an end view with parts removed showing the coupling of Fig. 11.

In Figs. 11 and 12 is illustrated a modification of the invention in which each of the hubs 1 and 2 is split longitudinally into two halves 28 and 29 which are drawn together to embrace the shafts 3 and 4 by means of bolts 25 extending through laterally directed mating flanges 26 formed on the hub halves 28 and 29. Likewise, the flanges 5 are diametrically split into two halves, one half 30 of each being connected to the half 28 of one of the hubs and the other half 31 of each being connected to the other half 29 of the hub. Preferably, the hub halves and flange halves are integral, as shown in Fig. 11, and may be made of any suitable rigid material such as metal. This type of coupling is preferred for applications requiring larger torque-transmitting capacity than embodied in couplings of the character described above. In drawing the two halves of each of the flanges 5 together by means of the bolts 25 of the beads 9 and 10 are subjected to considerable compressive forces. Accordingly, they are preferably internally reinforced by metal bands 27 vulcanized to the inner circumferential surface of the beads in the central bore 19.

The rolled rims 11 of the flanges 5 compress the beads 9 and 10 radially inward against the reinforcing bands 27 in a circumferential embrace. In this manner the transmission of the torque load is effected solely by frictional engagement between the flanges and the resilient body portion of the coupling. In the event of an overload slippage occurs between the beads and the flanges without injury to the coupling.

Figure 13:
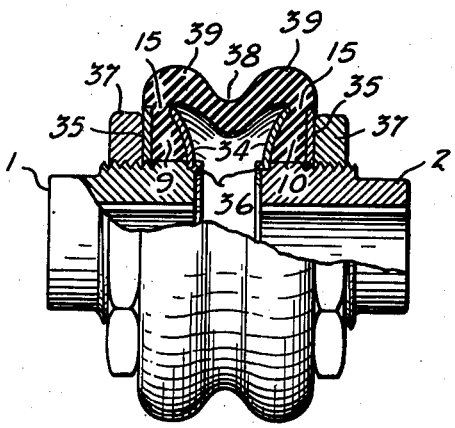
Fig. 13 is an elevational view with parts removed showing a different embodiment of the invention.
Figure 14:
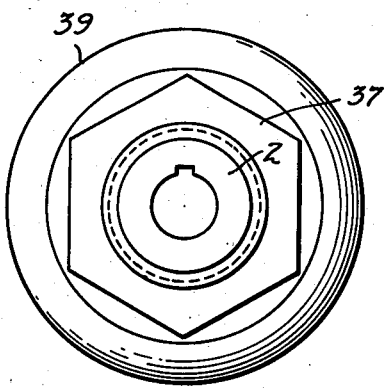
Fig. 14 is an end view of the coupling shown in Fig. 13.

In Figs. 13 and 14 is illustrated a modification of the invention in which the beads 9 and 10 are each compressed or held between an annular ringlike flange 34 and an annular washer 35, the latter being axially movable over the hub. The flanges 34 may be formed of rigid material such as steel or brass and are received on reduced diameter end portions of the hubs 1 and 2. The reduced diameter end portions are then upset or peened over as indicated at 36 of Fig. 13 to secure the flanges in position and against rotation. Preferably, the flanges 34 are of conical shape to lock the beads 9 and 10 against the hubs 1 and 2, respectively, and prevent the beads from being withdrawn radially from between the flanges and the washers 35. Nuts 37 are threaded on the hubs 1 and 2 so as to bear against the washers 35 and force the latter toward the flanges 34.

The yieldable resilient rubber band connecting the beads 9 and 10 is secured to the latter about the periphery thereof. Preferably the beads and connecting rubber band portions of the rubber body are integral and may be formed simultaneously in a single molding operation.

The annular band portion of the coupling body is substantially U or V-shaped in cross-section with the annular groove or channel 38 opening radially outward. On each side of the channel 38 are relatively thick sectioned portions 39 of the connecting torque-transmitting band and these thick portions are connected to the beads 9 and 10 at the marginal, relatively thin portions 15. This embodiment of the invention has improved shock-absorbing properties which materially prolongs the life of a prime mover, such as an electric motor or the like, driving an appliance through the coupling.

In all embodiments of the invention illustrated there is a resilient torque-transmitting body formed of rubber composition and including a substantially annular band having opposite marginal edge portions formed into thickened beads of substantially equal diameter. Extending between these beads is an annular shock-absorbing portion having a substantially annular groove formed therein midway between the beads. This shock-absorbing portion is unsupported for substantially free radial movement toward or away from the axis of the coupling to effect increased resiliency thereof during fluctuations in loads transmitted by the coupling. At each side of the deformable torque-transmitting body portion of the coupling is a relatively thin portion connected to the annular bead and arranged to improve the resiliency of the coupling. A space is provided between the rigid parts of the couplings so that longitudinal movement of one shaft with respect to the other is permitted.

Other modes of utilizing the principles of the invention may be resorted to without departing from the scope thereof, change being made in the particular details of construction as desired, it being understood that the embodiments shown are given for purposes of explanation and illustration.

What I claim is:

1. A torque transmitting body of resilient rubber composition for flexible couplings comprising a pair of spaced substantially circular beads disposed in substantially parallel relation to one another, an annular band portion having integral marginal portions, said marginal portions being connected to the beads radially inward from the outer edges of the beads and said beads being of greater cross sectional thickness than the marginal portions of the band to concentrate deformation of the body in said marginal portions.

2. A torque transmitting body of resilient rubber composition for flexible couplings comprising a pair of spaced substantially circular beads disposed in substantially parallel relation to one another, an annular band portion having integral marginal portions, said marginal portions being connected to the beads radially inward from the outer edges of the beads and said beads and the central part of the band portion being of greater cross sectional thickness than the marginal portions of the band to concentrate deformation of the body in said marginal portions.

3. A torque transmitting body of resilient rubber composition for flexible couplings comprising a pair of spaced substantially circular beads disposed in substantially parallel relation to one another, an annular band portion having integral marginal portions, said marginal portions being connected to the beads radially inward from the outer edges of the beads, said beads being of greater cross sectional thickness than the marginal portions of the band to concentrate deformation of the body in said marginal portions, and integral drive protuberances formed on said beads.

4. A torque transmitting body of resilient rubber composition for flexible couplings comprising a pair of substantially circular beads disposed in substantially parallel relation to one another, a substantially circular band disposed between the beads, said band being of greater diameter than the beads, marginal portions of the band being connected to the beads radially inward from the outer edges of the beads, and said beads being of greater cross sectional thickness than the marginal portions of the band to concentrate deformation of the body in said marginal portions.

5. A torque transmitting body of resilient rubber composition for flexible couplings comprising a pair of substantially circular beads disposed in substantially parallel relation to one another, each bead being of greater radial than axial thickness, a substantially circular band disposed between the beads, and connecting portions of thinner section than the beads extending angularly between the band and beads, said connecting portions being attached to the beads radially inward from the outer edges of the beads.

6. A torque transmitter comprising a circular body of resilient rubber composition, an axial bore through the body, said bore having a portion of increased diameter between the ends of the body, said body having end beads and a band portion connecting the beads, a pair of circular grooves formed about the outer periphery of the body in spaced parallel relation and separating the band portion from the beads, said increased diameter portion of the bore being of greater axial length than the distance between said grooves, and means for securing the beads to shafts.

7. A coupling comprising a substantially circular body of deformable rubber composition having a circumferential radially extending integral bead at one end thereof, a hub for securing the coupling to a shaft, a flange on the hub disposed against said end of the rubber body, and a circumferential inturned rim on the periphery of the flange, said rim extending over the outer periphery of the bead and radially inward over the side of the bead opposite the side thereof disposed against the flange whereby the bead is substantially embraced by the rim and restrained against endwise movement thereby.

8. A coupling comprising a substantially circular body of deformable rubber composition having a circumferential radially extending integral bead at one end thereof, a hub for securing the coupling to a shaft, a flange on the hub disposed against said end of the rubber body, a circumferential inturned rim on the periphery of the flange, said rim extending over the outer periphery of the bead and radially inward over the side of the bead opposite the side thereof disposed against the flange whereby the bead is substantially embraced by the rim and restrained against endwise movement thereby, and a reinforcing member of substantially complete peripheral extent disposed radially inward of the bead and the rim and in concentric relation thereto.

9. A coupling comprising a substantially circular body of deformable rubber composition having a circumferential radially extending integral bead at one end thereof and a circumferential groove adjacent the bead, a hub for securing the coupling to a shaft, a flange on the hub, and a circumferential, inturned rim on the flange, said rim extending over the bead and the inturned edge of the rim disposed in said groove.

10. A coupling comprising a resilient body having a circumferential bead, a flanged hub at one end of the body for securing the coupling to a shaft, and an inturned rim on the flange of the hub, said rim extending over the outer periphery of the bead and the inturned edge of the rim being directed toward the rotational axis of the hub.

11. A coupling comprising a resilient body having a circumferential bead and a groove adjacent the bead, a flanged hub at one end of the body for securing the coupling to a shaft, and an inturned rim on the flange of the hub, said rim extending over the outer periphery of the bead and the edge of the rim being disposed in said groove.

12. A coupling comprising a resilient body having a circumferential bead and a groove adjacent the bead, a flanged hub at one end of the body for securing the coupling to a shaft, and an inturned rim on the flange of the hub, said rim extending over the outer periphery of the bead and the edge of the rim being disposed in said groove and spaced from the bottom thereof.

13. A coupling comprising a substantially circular resilient rubber body having a circumferential bead at one end thereof, a hub for securing the coupling to a shaft, a radially extending flange on the hub disposed against said end of the rubber body, and an inturned rim on the flange to embrace the bead, said body being formed so that in its normal unstressed state the central portions of said end thereof project beyond the plane of such end when the end is against the flange and the bead is embraced by the rim whereby the inherent resiliency of the body presses said central portions of the body against the flange and the bead against the inturned edge of the rim.

14. A coupling comprising a resilient body having a circumferential bead and a groove adjacent the bead, a flanged hub at one end of the body for securing the coupling to a shaft, an inturned rim on the flange of the hub, said rim extending over the outer periphery of the bead and the edge of the rim being disposed in said groove, and interlocking formations on the flange of the hub and the body to resist relative turning movement therebetween.

GLENN H. ORR.